(12) United States Patent
Nakada et al.

(10) Patent No.: US 6,563,693 B2
(45) Date of Patent: May 13, 2003

(54) SOLID ELECTROLYTIC CAPACITOR

(75) Inventors: Yasuhiko Nakada, Moriguchi (JP); Mikinari Shimada, Yawata (JP); Tsunenori Yoshida, Yawata (JP); Kanji Katou, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/188,590

(22) Filed: Jul. 2, 2002

(65) Prior Publication Data

US 2003/0026064 A1 Feb. 6, 2003

(30) Foreign Application Priority Data

Jul. 2, 2001 (JP) ........................................ 2001-201091

(51) Int. Cl.[7] ................................................ H01G 9/00
(52) U.S. Cl. ........................ 361/523; 361/528; 361/531
(58) Field of Search ................................. 361/523, 528, 361/531, 532, 533, 540, 538, 541

(56) References Cited

FOREIGN PATENT DOCUMENTS

| JP | 5-175085 | 7/1993 |
|---|---|---|
| JP | 5-217811 | 8/1993 |
| JP | 5-326343 | 12/1993 |
| JP | 6-188157 | 7/1994 |
| JP | 8-273983 | 10/1996 |

*Primary Examiner*—Anthony Dinkins
(74) *Attorney, Agent, or Firm*—Merchant & Gould P.C.

(57) ABSTRACT

A solid electrolytic capacitor includes a capacitor element including a capacitance forming portion; an encapsulating resin with which the capacitance forming portion is coated; an anode terminal and a cathode terminal that are provided such that at least a part thereof is outside the encapsulating resin; and a lead. The capacitor element includes an anode, and a dielectric layer and a solid electrolytic layer that are laminated on a portion of the anode in this order. The lead is electrically connected to the solid electrolytic layer. The surface of at least one component selected from the anode and the lead has roughness in at least one connection portion selected from a connection portion between the anode and the anode terminal and a connection portion between the lead and the cathode terminal.

13 Claims, 6 Drawing Sheets

SOLID ELECTROLYTIC CAPACITOR

BACKGROUND OF THE INVENTION

1. Field of the Invention

The present invention relates to a solid electrolytic capacitor.

2. Description of the Related Art

A solid electrolytic capacitor is a capacitor in which an oxide film (dielectric) is formed on a surface of a valve metal such as aluminum by anodization, and a solid electrolytic layer is in contact with the oxide film. In the solid electrolytic capacitor, the valve metal constitutes an anode, and the solid electrolytic layer constitutes a cathode.

FIG. 7 is a cross-sectional view showing the structure of a conventional solid electrolytic capacitor of a type in which current is collected at end faces thereof (hereinafter, this type is referred to as "end face-current collecting type solid electrolytic capacitor). A solid electrolytic capacitor 1 of FIG. 7 includes a laminate of a plurality of capacitor elements 2, and the laminate is coated with an encapsulating resin 3. The capacitor element 2 includes an anode 2a, and a dielectric layer 2b, a solid electrolytic layer 2c, and a conductive layer 2d that are laminated on the surface of the anode 2a in this order. The conductive layer 2d is connected to a lead 5 via a conductive adhesive 4. A part of the lead 5 is exposed from the encapsulating resin 3, and the lead 5 is connected to a cathode terminal 6 via the conductive adhesive 4 at the exposed portion. Similarly, a part of the anode 2a is exposed from the encapsulating resin 3, and the anode 2a is connected to an anode terminal 7 via the conductive adhesive 4 at the exposed portion.

However, in the conventional end face-current collecting type solid electrolytic capacitor 1, a connection resistance in the portion where the anode 2a, the conductive resin 4 and the anode terminal 7 are connected is large, and a connection resistance in the portion where the lead 5, the conductive resin 4 and the cathode terminal 6 are connected is large, and therefore the equivalent series resistance (ESR) of the capacitor is large. In order to reduce the connection resistance, a plating process technique that allows connection at a low resistance or a conductive adhesive that allows connection at a low resistance should be developed.

However, since the connection resistance is inversely proportional to the area of the connection surface, sufficient effects cannot be obtained simply by applying a plating process technique or a conductive adhesive that allows connection at a low resistance to a flat connection surface.

SUMMARY OF THE INVENTION

Therefore, with the foregoing in mind, it is an object of the present invention to provide a solid electrolytic capacitor having a low ESR.

A first solid electrolytic capacitor of the present invention includes a capacitor element including a capacitance forming portion; an encapsulating resin with which the capacitance forming portion is coated; an anode terminal and a cathode terminal that are provided such that at least a part thereof is outside the encapsulating resin; and a lead. The capacitor element includes an anode, and a dielectric layer and a solid electrolytic layer that are laminated on a portion of the anode in this order. The lead is electrically connected to the solid electrolytic layer. The surface of at least one component selected from the anode and the lead has roughness in at least one connection portion selected from a connection portion between the anode and the anode terminal and a connection portion between the lead and the cathode terminal.

In this specification, "being electrically connected" means that two components are connected directly or connected via a component serving as an electrical connection.

A second solid electrolytic capacitor of the present invention includes a capacitor element including a capacitance forming portion; an encapsulating resin with which the capacitance forming portion of the capacitor element is coated; an anode terminal and a cathode terminal that are provided such that at least a part thereof is outside the encapsulating resin; and a lead. The capacitor element includes an anode, and a dielectric layer and a solid electrolytic layer that are laminated on a portion of the anode in this order. The lead is electrically connected to the solid electrolytic layer. At least one component selected from the anode and the lead is electrically connected to at least one terminal selected from the anode terminal and the cathode terminal via a conductor provided on a surface of the component that is parallel to a direction in which the component is drawn out.

In the first solid electrolytic capacitor of the present invention, the surface of the anode or the cathode lead in the connection portion with the electrode terminal is processed so as to increase the surface area. Therefore, the first solid electrolytic capacitor has a small ESR.

In the second solid electrolytic capacitor of the present invention, a conductor is provided on the surface of the anode drawn-out portion or the cathode lead, and the anode drawn-out portion or the cathode lead is connected to the electrode terminal via the conductor. Therefore, the second solid electrolytic capacitor has a current collecting path having a large cross-section area and a small ESR.

DESCRIPTION OF THE PREFERRED EMBODIMENTS

Figure 1A:
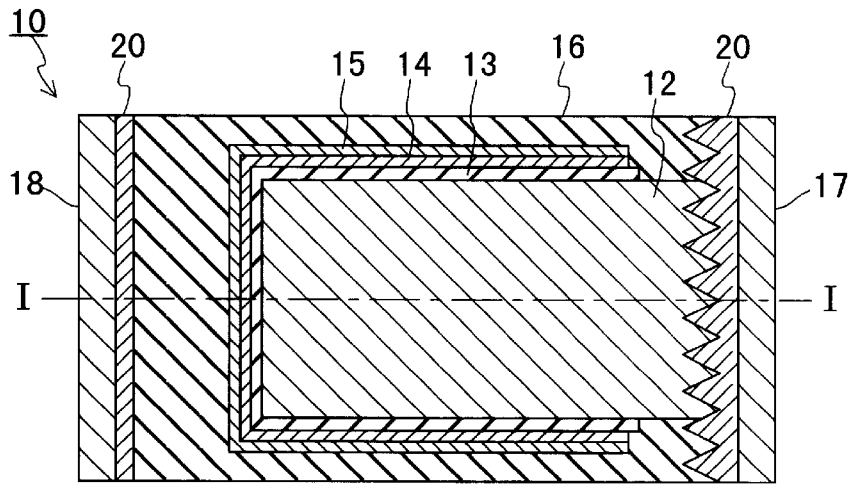
FIG. 1A is a cross-sectional view of an example of a solid electrolytic capacitor of a first embodiment of the present invention.

A first solid electrolytic capacitor of the present invention includes at least one capacitor element including a capacitance forming portion; an encapsulating resin with which the capacitance forming portion is coated; an anode terminal and a cathode terminal that are provided such that at least a part thereof is outside the encapsulating resin; and a lead.

The capacitor element includes an anode, and a dielectric layer and a solid electrolytic layer that are laminated on a portion of the anode in this order. The lead is electrically connected to the solid electrolytic layer. The surface of at least one component selected from the anode and the lead is processed to have roughness in at least one connection portion selected from a connection portion between the anode and the anode terminal and a connection portion between the lead and the cathode terminal. The roughness may be, for example, saw tooth shaped, rectangular, or wave-shaped, when viewed in cross-section. In the first solid electrolytic capacitor, the surface of the anode and/or the lead is processed so that the surface area thereof is increased. Since the connection resistance in the connection portion is reduced in inverse proportion to the connection area, the resistance between the electrode terminal and the anode or the cathode is reduced, and thus a solid electrolytic capacitor having a low ESR can be obtained. In the solid electrolytic capacitor, the lead frame structure can be provided either on the anode side or the cathode side (which is true for the second solid electrolytic capacitor described later). When the lead frame structure is provided on the cathode side, the lead frame connected to the lead serves as the cathode terminal. The lead may be a part of the lead frame (that is to say, the lead and the cathode terminal can be formed with the same component). In this case, the lead frame is electrically connected to the solid electrolytic layer. When the lead frame structure is provided on the anode side, the lead frame electrically connected to the anode serves as the anode terminal.

The first solid electrolytic capacitor further may include a conductor provided on a surface of the anode that is parallel to a direction in which the anode is drawn out, and the anode may be electrically connected to the anode terminal via the conductor. In this case, in the first solid electrolytic capacitor, the surface of a portion of the anode in which the conductor is provided may be rough. These embodiments make it possible further to reduce the resistance in the connection portion.

The first solid electrolytic capacitor further may include a conductor provided on a surface of the lead that is parallel to a direction in which the lead is drawn out, with the lead being electrically connected to the cathode terminal via the conductor. In this case, the surface of a portion of the lead in which the conductor is provided may be rough. These embodiments make it possible further to reduce the resistance in the connection portion.

In the first solid electrolytic capacitor, the conductor may contain at least one metal selected from gold, silver, copper, aluminum and nickel. These metals are preferable as the material for the conductor, because they have a low specific resistance.

In the first solid electrolytic capacitor, the conductor may contain at least one selected from carbon fibers and carbon particles. These carbon materials are preferable as the material for the conductor, because their surfaces are not susceptible to oxidation.

The first solid electrolytic capacitor may include a plurality of the capacitor elements. The capacitance forming portions of the plurality of capacitor elements may be laminated and coated with the encapsulating resin. A capacitor having an arbitrary capacitance can be obtained by changing the number of the capacitor elements to be laminated.

In the first solid electrolytic capacitor, a plating layer may be formed on a surface of the at least one component in the at least one connection portion. This embodiment can provide an electrolytic capacitor having a particularly low ESR. In this case, the plating layer may include a zinc layer, a nickel layer and a gold layer that are laminated in this order from the at least one component.

In the first solid electrolytic capacitor, at least one terminal selected from the anode terminal and the cathode terminal may be concave.

A second solid electrolytic capacitor of the present invention includes a capacitor element including a capacitance forming portion; an encapsulating resin with which the capacitance forming portion of the capacitor element is coated; an anode terminal and a cathode terminal that are provided such that at least a part thereof is outside the encapsulating resin; and a lead. The capacitor element includes an anode, and a dielectric layer and a solid electrolytic layer that are laminated on a portion of the anode in this order. The lead is electrically connected to the solid electrolytic layer. At least one component selected from the anode and the lead is electrically connected to at least one terminal selected from the anode terminal and the cathode terminal via a conductor provided on a surface of the component that is parallel to a direction in which the component is drawn out. In the second solid electrolytic capacitor, the terminal is connected via the conductor, so that the ESR can be reduced.

Hereinafter, embodiments of the present invention will be described more specifically with reference to the accompanying drawings.

Embodiment 1

Figure 1B:
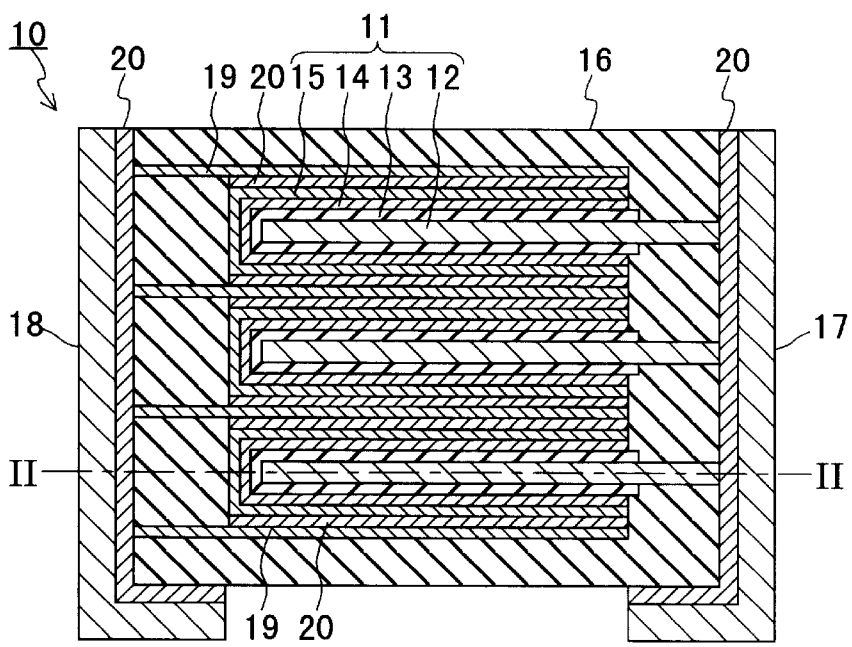
FIG. 1B is another cross-sectional view thereof

In Embodiment 1, an example of the solid electrolytic capacitor of the present invention will be described. FIG. 1A is a cross-sectional view of a solid electrolytic capacitor 10 of Embodiment 1, and FIG. 1B is a cross-sectional view taken along line I—I of FIG. 1A. FIG. 1A is a cross-sectional view taken along line II—II of FIG. 1B.

Referring to FIG. 1, the solid electrolytic capacitor 10 includes a capacitor element 11 including a capacitance forming portion 11a (see FIG. 2), an encapsulating resin 16 with which the capacitance forming portion 11a is coated, an anode terminal 17 and a cathode terminal 18 that are provided such that at least a part thereof is outside the encapsulating resin 16, and a lead 19. Embodiment 1 describes a solid electrolytic capacitor including a plurality of capacitor elements 11 in which the capacitance forming portions 11a of the plurality of capacitor elements 11 are laminated and are coated with the encapsulating resin 16. However, the solid electrolytic capacitor of the present invention may include only one capacitor element (which also applies in the following embodiment). There is no particular limitation regarding the number of the capacitor elements to be laminated, and the number can be set in accordance with the necessary capacitance.

Figure 2:
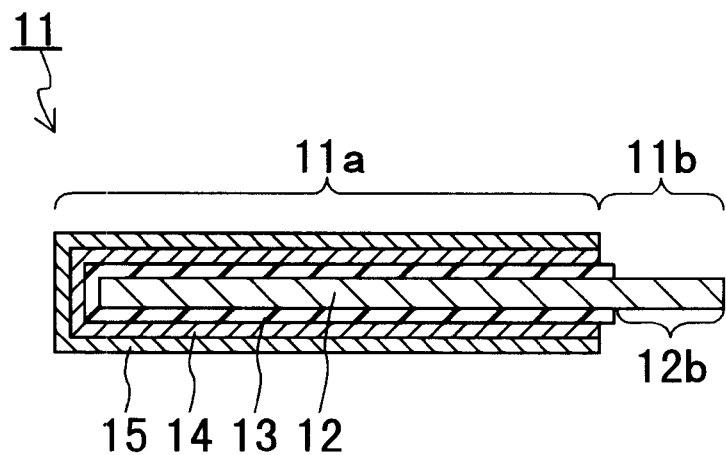
FIG. 2 is a cross-sectional view of an example of a capacitance forming portion of the solid electrolytic capacitor of the present invention.

FIG. 2 shows a cross-sectional view of the capacitor element 11. The capacitor element 11 includes an anode 12, and a dielectric layer 13, a solid electrolytic layer 14 and a conductive layer 15 that are laminated on the anode 12 in this order. The capacitor element 11 includes the capacitance forming portion 11a that forms a capacitance and a lead portion 11b that does not participate in the formation of the capacitance. The portion in which the dielectric layer 13, the solid electrolytic layer 14 and the conductive layer 15 are laminated constitutes the capacitance forming portion 11a.

The anode 12 can be formed of a metal such as aluminum, tantalum or niobium. The shape of the anode 12 can be, for example, plate-like, although it is not limited thereto. In this case, the thickness of the anode 12 is, for example, 50 μm to 150 μm, and preferably 80 μm to 120 μm. Furthermore, it is preferable that the anode 12 is a porous member having a large number of fine pores that are in communication with the surface. Such an anode 12 can be produced by subjecting an aluminum foil to a treatment to make the surface rough, such as etching, in the case where aluminum is used. When tantalum or niobium is used, the anode 12 can be produced by compressing and molding metal powder of these metals and sintering the molded product.

As the dielectric layer 13, an oxide film of the valve metal of which the anode 12 is formed can be used. The dielectric layer 13 can be formed on the surface of the anode 12, excluding the anode drawn-out portion 12b for electrical connection to the anode terminal 17. The dielectric layer 13 can be formed by anodizing the anode 12 while masking a portion (a portion that will be formed into the anode drawn-out portion 12b) of the anode 12. Alternatively, the dielectric layer 13 can be formed on the portion other than the anode drawn-out portion 12b by anodizing the entire surface of the anode 12 and then physically removing the oxide film formed on the anode drawn-out portion 12b.

The solid electrolytic layer 14 constitutes a cathode and can be formed, for example, of polypyrrole or polythiophene. In this case, the solid electrolytic layer 14 can be formed by polymerizing a monomer of pyrrole or thiophene on the surface of the dielectric layer 13. For the solid electrolytic layer 14, a material such as manganese dioxide also can be used. The solid electrolytic layer 14 made of manganese dioxide can be formed by, for example, pyrolyzing a manganese salt such as manganese nitrate on the surface of the dielectric layer 13.

For the conductive layer 15, for example, conductive paste such as carbon paste or silver paste can be used. The conductive layer 15 can have either a single layer structure or a multi-layer structure.

The conductive layer 15 is connected to a lead 19 via a conductive adhesive 20. In other words, the lead 19 is electrically connected to the solid electrolytic layer 14 via the conductive layer 15 and the conductive adhesive 20. For the conductive adhesive 20, for example, metal paste such as silver paste can be used. For the lead 19, a metal foil such as gold, silver, copper, aluminum or nickel can be used. In this case, the metal foil whose surface has been subjected to blast processing or plating beforehand can be used. Alternatively, a metal plating layer is formed on the surface of the conductive layer 15, and the conductive layer 15 can be connected to lead 19 via the metal plating layer. In the capacitor element 11 of FIG. 1B, the adjacent capacitance forming portions 11a are electrically connected via the conductive adhesive 20 and the lead 19.

The capacitance forming portion 11a of the capacitor element 11 is coated with the encapsulating resin 16. As the encapsulating resin 16, for example, an epoxy resin can be used, and the capacitance forming portion 11a can be coated by molding with molds, dip molding or the like.

The anode terminal 17 and the cathode terminal 18 are terminals for connecting the anode 12 and the cathode (solid electrolytic layer 14), respectively, of the capacitor element 11 and an external electrical circuit. The anode terminal 17 and the cathode terminal 18 can be formed of a metal plate, metal paste such as silver paste, or a combination thereof. The anode terminal 17 and the cathode terminal 18 can be formed by plating a metal, for example, by plating copper electrolytically.

The lead 19 is exposed to the outside of the encapsulating resin 16, and the exposed lead 19 is electrically connected to the cathode terminal 18. The connection between the cathode terminal 18 and the exposed lead 19 can be established with the conductive adhesive 20.

A portion (a portion of the anode drawn-out portion 12b) of the anode 12 is electrically connected to the anode terminal 17 via the conductive adhesive 20. The connection portion between the anode 12 and the anode terminal 17 is exposed to the outside of the encapsulating resin 16. In other words, the connection portion is not covered with the encapsulating resin 16. The surface of the anode 12 in the connection portion is processed so as to be saw tooth shaped, as shown in FIG. 1A. Therefore, in the solid electrolytic capacitor 10, the surface area of the anode 12 in the connection portion is larger than that when cutting is performed so as to form a flat surface. The surface of the anode 12 in the connection portion can be processed to have roughness of any shape instead of a wedge shape, such as a rectangular shape or a wave shape, as long as the surface area is increased. It is preferable that the difference between the highest portion and the lowest portion in the roughness is $1.0 \times 10^{-3}$ mm to 1.0 mm (by cutting machine, for example, $5.0 \times 10^{-2}$ mm to 1.0 mm). It is preferable that the distance between the adjacent lowest portions and the distance between the adjacent highest portions are $1.0 \times 10^{-3}$ mm to 1.0 mm (by cutting machine, for example, $5.0 \times 10^{-2}$ mm to 1.0 mm). The surface area can be increased further by subjecting the connection portion of the anode to a treatment to make the surface rough, for example using a surface-treatment technique such as blast processing or etching, either alone or in combination. Alternatively, a plating layer can be formed on the surface of the anode 12 in the connection portion or on the surface of the anode terminal 17 in the connection portion.

Figure 3:
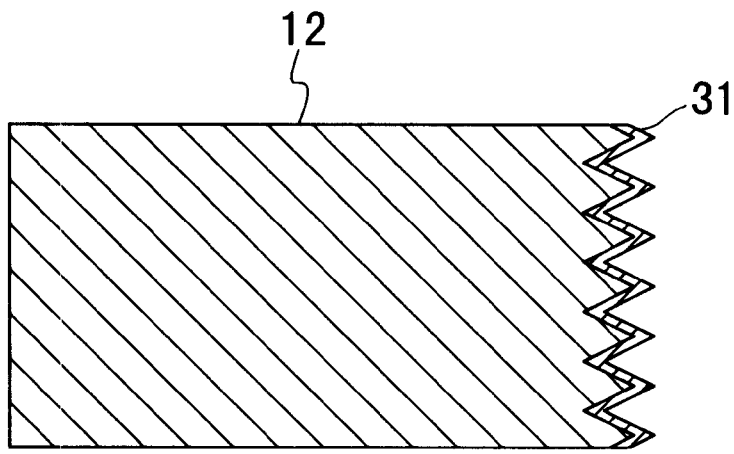
FIG. 3 is a cross-sectional view of an example of an anode of the solid electrolytic capacitor of the present invention.

FIG. 3 is sectional view of an end face of the anode 12 when a plating layer is formed on the surface of the anode 12 in the connection portion. FIG. 3 is a view from the same position as in FIG. 1A. A plating layer 31 is formed on an end face of the anode 12 in FIG. 3.

Embodiment 1 describes the case where the surface of the anode 12 in the connection portion is processed, but the cathode side, that is, the surface of the lead 19 in the connection portion may be processed. In other words, it is sufficient that at least one surface selected from the surfaces of the anode 12 and the lead 19 is processed to have roughness (e.g., saw tooth shaped, rectangular or wave-shaped) in the connection portion with the terminal.

It is not necessary that both the anode and the cathode have an end-face current collecting structure, and for example, only one of the electrodes can have a lead frame structure (which applies in the following embodiments).

Embodiment 2

Figure 4A:
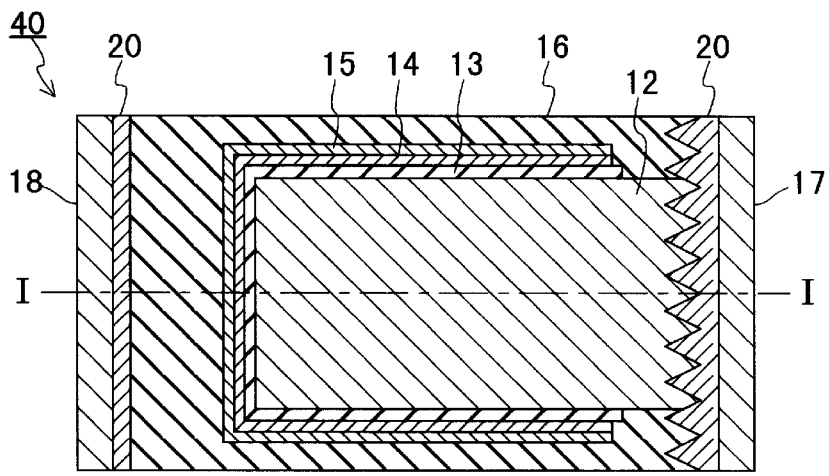
FIG. 4A is a cross-sectional view of an example of a solid electrolytic capacitor of a second embodiment of the present invention.
Figure 4B:
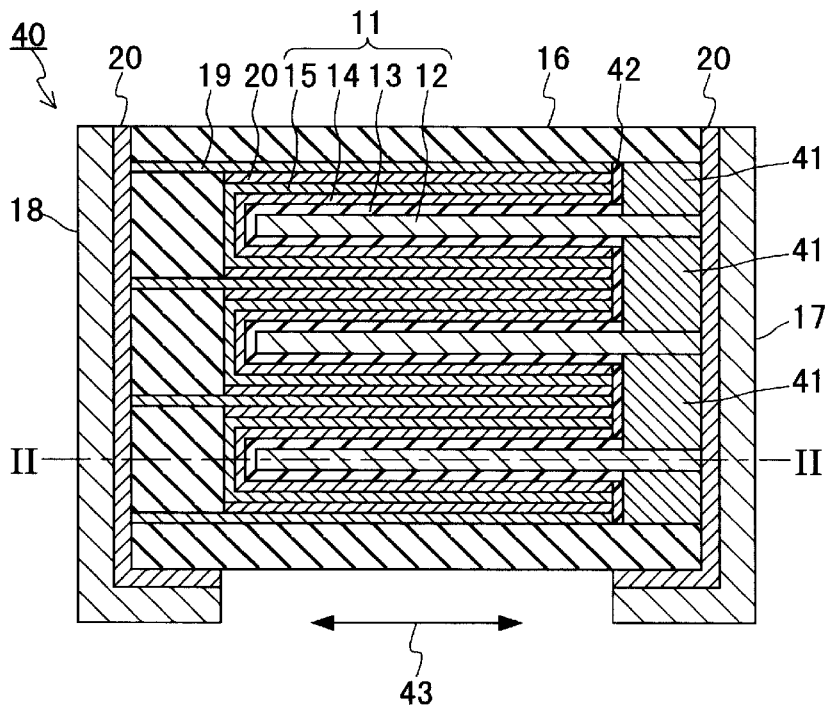
FIG. 4B is another cross-sectional view thereof.

In Embodiment 2, another example of the solid electrolytic capacitor of the present invention will be described. The same components as in Embodiment 1 have the same reference numerals, and a duplicate description thereof is omitted. FIG. 4A is a cross-sectional view of a solid electrolytic capacitor 40 of Embodiment 2, and FIG. 4B is a cross-sectional view taken along line I—I of FIG. 4A. FIG. 4A is a cross-sectional view taken along line II—II of FIG. 4B.

Referring to FIG. 4, the solid electrolytic capacitor 40 includes a capacitor element 11 including a capacitance forming portion 11a (see FIG. 2), an encapsulating resin 16 with which the capacitance forming portion 11a is coated, an anode terminal 17 and a cathode terminal 18 that are provided such that at least a part thereof is outside the encapsulating resin 16, a lead 19 and a conductor 41. The capacitance forming portion 11a is insulated from the conductor 41 via an insulator 42. A polyimide film can be used as the insulator 42, for example.

The capacitor element 11 is the same as that in Embodiment 1. The solid electrolytic layer 14 of the capacitor element 11 is connected to the lead 19 via the conductive layer 15 and the conductive adhesive 20 in the same manner as in Embodiment 1. The lead 19 is connected to the cathode terminal 18 in the same manner as in Embodiment 1.

In the solid electrolytic capacitor 40, the conductor 41 is provided on the surface of the anode drawn-out portion 12b of the anode 12 that is parallel to the direction 43 in which the anode 12 is drawn out. The anode 12 is electrically connected to the anode terminal 17 via the conductor 41. It is preferable that the conductor 41 is formed so as to be in contact with the entire surface of the anode drawn-out portion 12b. Furthermore, it is preferable that the anode drawn-out portions 12b of the adjacent capacitor elements 11 are electrically connected via the conductor 41.

The connection between the conductor 41 and the anode terminal 17 can be established with the conductive adhesive 20 in the same manner as in Embodiment 1. The surface of the conductor 41 that is in contact with the conductive adhesive 20 or the surface of the anode terminal 17 that is in contact with the conductive adhesive 20 can be subjected to a plating treatment. It is preferable that the connection portion between the conductor 41 and the anode terminal 17 is exposed to the outside of the encapsulating resin 16, and the surface of the conductor 41 in the connection portion is processed so as to be roughened, for example saw tooth shaped as is the case for the anode 12, as shown in FIG. 4A. The surface of the conductor 41 in the connection portion can be processed to have roughness of any shape, instead of a wedge shape, such as a rectangular shape or a wave shape, as long as the surface area is increased. It is preferable that the difference between the highest portion and the lowest portion in the roughness is $1.0\times10^{-3}$ mm to 1.0 mm (by cutting machine, for example, $5.0\times10^{-2}$ mm to 1.0 mm). It is preferable that the distance between the adjacent lowest portions and the distance between the adjacent highest portions are $1.0\times10^{-3}$ mm to 1.0 mm (by cutting machine, for example, $5.0\times10^{-2}$ mm to 1.0 mm). The surface area can be increased further by subjecting the surface of the conductor 41 in the connection portion to a treatment to make the surface rough, using a surface-treatment technique such as blast processing or etching alone or a combination thereof. The treatment for increasing the surface area by processing the surface in the connection portion can be performed with respect to the cathode side (lead 19), instead of the anode.

When the conductor 41 is exposed to the outside of the encapsulating resin 16, the anode drawn-out portion 12b does not necessarily have to be exposed, but it is preferable that the anode drawn-out portion 12b as well as the conductor 41 is exposed to the outside of the encapsulating resin 16. There is no particular limitation regarding the area of the region in which the conductor 41 is formed, but it is preferable that the area is 50 to 100% of the surface area of each anode drawn-out portion 12b, and it is particularly preferable that it is 90 to 100%. It is preferable that the surface of the portion of the anode drawn-out portion 12b in which the conductor 41 is provided is made rough by blast processing or the like.

The conductor 41 may contain at least one metal selected from the group consisting of gold, silver, copper, aluminum and nickel. Alternatively, the conductor 41 can be formed of a conductive resin containing carbon fibers or carbon particles.

Figure 5:
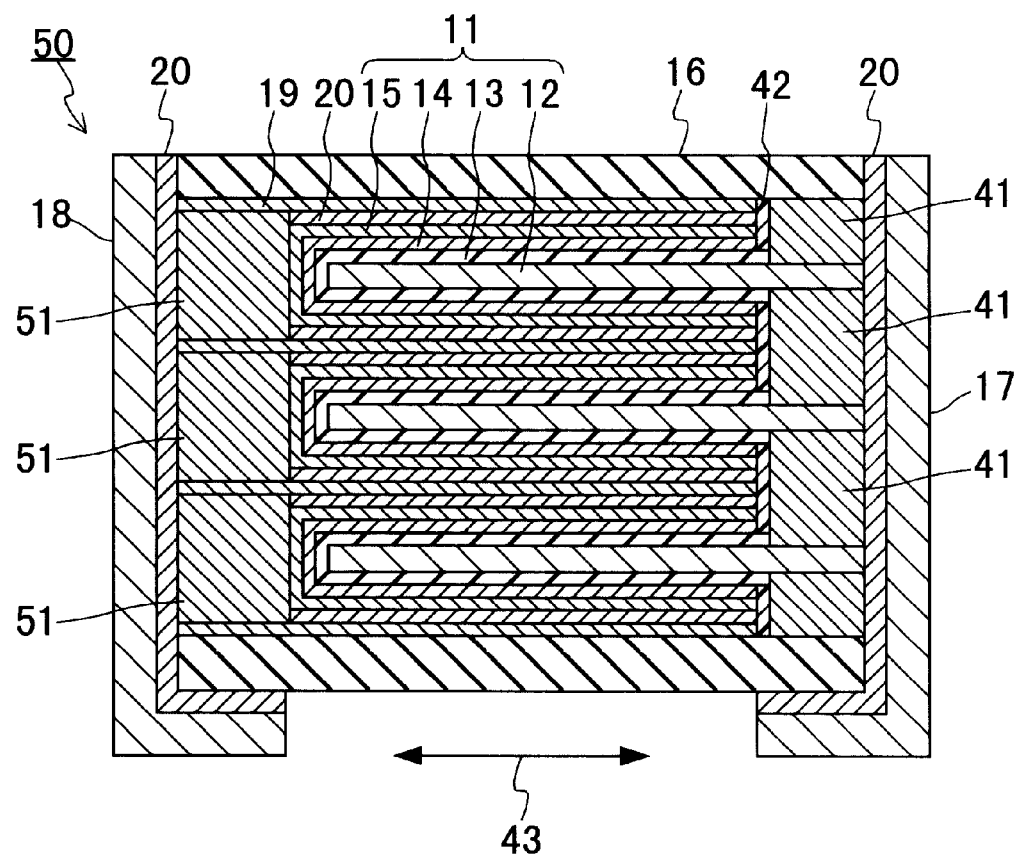
FIG. 5 is a cross-sectional view of another example of the solid electrolytic capacitor of the present invention.

Embodiment 2 describes the case where the conductor 41 is provided on the surface of the anode drawn-out portion 12b, but the conductor can be provided on the surface of the lead 19. In other words, it is sufficient that at least one component selected from the anode 12 and the lead 19 is electrically connected to either the anode terminal or the cathode terminal via the conductor provided on the surface of that component. FIG. 5 is a cross-sectional view of a solid electrolytic capacitor 50 in which the conductor is provided on the surfaces of both anode 12 and the lead 19. FIG. 5 is a cross-sectional view from the same position as FIG. 4A. The solid electrolytic capacitor 50 includes a conductor 51 provided on the surface of the lead 19, in addition to all the components constituting the solid electrolytic capacitor 40. The conductor 51 connects the lead 19 and the conductive adhesive 20. The conductor 51 can be formed of the same material as that for the conductor 41.

Figure 6:
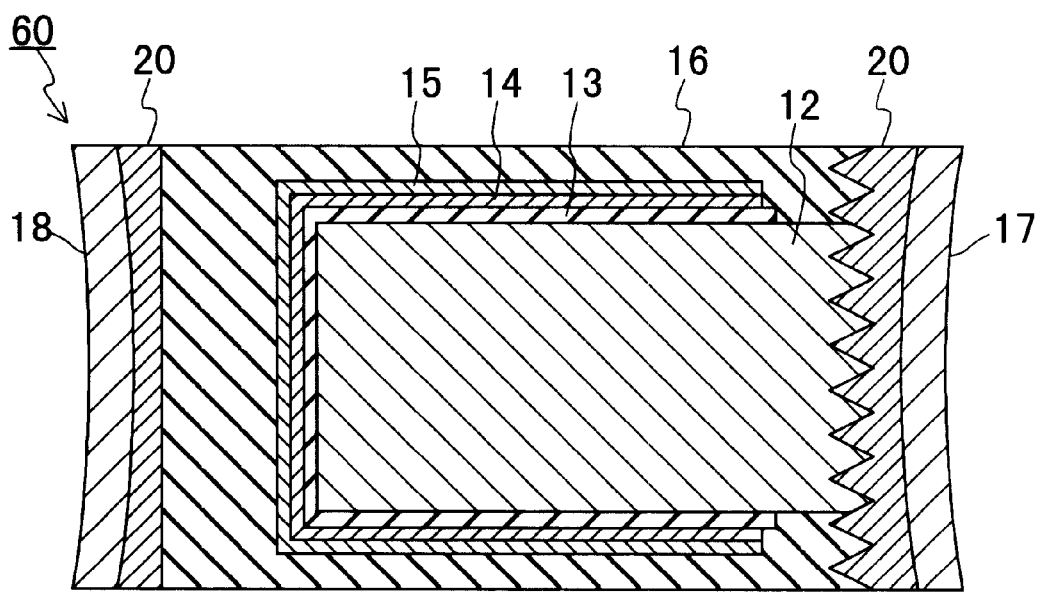
FIG. 6 is a cross-sectional view of yet another example of the solid electrolytic capacitor of the present invention.
Figure 7:
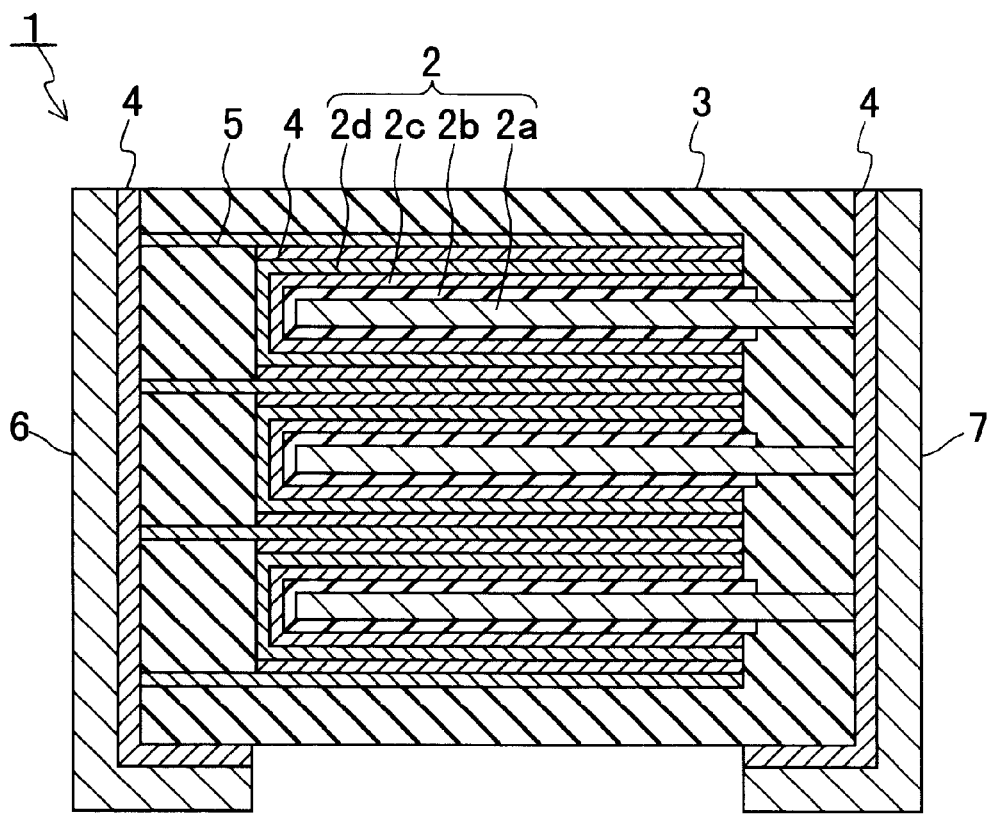
FIG. 7 is a cross-sectional view of an example of a conventional solid electrolytic capacitor.

In the capacitors of Embodiments 1 and 2, at least one terminal selected from the anode terminal and the cathode terminal may be concave. FIG. 6 is a cross-sectional view of a solid electrolytic capacitor 60 including an anode terminal and a cathode terminal having such a shape. FIG. 6 is a cross-section view from the same position as in FIG. 4A. In the solid electrolytic capacitor 60, the anode terminal 17 and the cathode terminal 18 are concave inward to the inner portion of the capacitor. This structure allows the capacitor to be mounted on a circuit board stably.

EXAMPLE

Hereinafter, the present invention will be described more specifically by way of example. In this example, a plurality of solid electrolytic capacitors are produced and the ESRs thereof are measured.

Samples A and B

First, an aluminum foil having a purity 99.9% and a thickness of 100 $\mu$m was prepared, and immersed in an acidic aqueous solution with pH 1 or less containing hydrochloric acid as the main component. The aluminum foil was subjected to electrolytic etching by applying an alternating voltage between the aluminum foil and an electrode made of carbon that was attached to the container of the acidic aqueous solution. When the area increase ratio (i.e., a value of (the surface area after the treatment)/(the surface area before the treatment)) of the aluminum foil reached a factor of about 100, the etching was stopped, and the aluminum foil was lifted out of the acidic aqueous solution, washed sufficiently, and then dried.

Next, the aluminum foil was immersed in a weakly acidic aqueous solution with about pH 6 containing ammonium adipate as the main component. Anodization was performed by applying a direct voltage between the aluminum foil as an anode and a stainless steel cathode attached to the container of the ammonium adipate to form a dielectric layer. The operation of anodization was stopped at the point when a dielectric layer having a withstand voltage of 5 V was formed, and the aluminum foil was lifted out of the ammonium adipate aqueous solution, washed sufficiently, and then dried.

The aluminum foil was stamped with a die. The stamping was performed such that the portion to be formed into the capacitance forming portion has a rectangular shape having a length of 3.5 mm and a width of 3.0 mm, and this portion was provided with a portion to serve as the anode drawn-out portion.

Next, in order to obtain conduction in electrolytic polymerization, the surface of the dielectric layer in the portion to be formed into the capacitance forming portion was coated with a conductive material. Thereafter, an electrode for growing an electrolytically polymerized film was attached to the aluminum foil, and the portion to be formed into the capacitance forming portion was immersed in a pyrrole monomer solution. Using the electrode attached to the aluminum foil as the anode and a carbon electrode attached to the container of the pyrrole monomer solution as the cathode, a direct voltage was applied between these electrodes, so that a polypyrrole layer (solid electrolytic layer) was grown on the dielectric layer by electrolytic polymerization. Then, the electrolytic polymerization was stopped when the dielectric layer was coated with the polypyrrole layer, and the aluminum foil was washed with alcohol and then with water, and then dried.

Thereafter, a carbon paste was applied onto the polypyrrole layer, and a silver paste was applied thereto to form a two-layered conductive layer, and thus a capacitor element was produced. Next, the capacitor elements were laminated to form a laminate. In this case, the conductive layers of the adjacent capacitors were attached to each other with a silver paste. In this example, 16 capacitor elements were used to produce the laminate.

A lead frame was attached to the conductive layer of the capacitor element of the outermost layer of the laminate with a silver paste. Thereafter, the laminate was coated with an encapsulating resin by molding. Next, the molded laminate was cut at a predetermined position to expose the lead frame on the cathode side and the anode drawn-out portion of the anode. The exposed anode side was processed so as to be saw tooth shaped to increase the surface area. This process was performed with a cutting machine with an outer circumferential blade. Then, a zinc layer was formed on the surface of the exposed anode drawn-out portion by metal substitution. Thereafter, a nickel layer and a gold layer were formed in this order by electroless plating. Finally, an anode terminal was attached with a silver paste. Thus, a solid electrolytic capacitor (sample A) of Embodiment 1 was produced.

On the other hand, a solid electrolytic capacitor (sample B) was produced in the same manner as in the case of sample A, except that the plating layers were not formed on the saw tooth shaped surface of the anode drawn-out portion.
Samples C and D First, capacitor elements were produced in the same manner as in the case of sample A. On the other hand, a silver foil having a thickness of 100 μm was prepared and was stamped out with a die so as to have a shape that matches that of the anode drawn-out portion of the capacitor element when they are superposed.

Next, the capacitor elements were laminated to produce a laminate. Before the capacitor elements were laminated, each anode drawn-out portion had been subjected to blast processing. Furthermore, the silver foil was provided between the anode drawn-out portions, and the anode drawn-out portion and the silver foil were electrically connected. The anode drawn-out portion and the silver foil were attached with a silver paste. In this production of the laminate, 16 capacitor elements and 17 silver foils were used.

A lead frame was attached to the conductive layer of the outermost layer of the laminate with a silver paste. Thereafter, the laminate was coated with an encapsulating resin by molding. Next, the molded laminate was cut at a predetermined position to expose the lead frame on the cathode side, the anode drawn-out portion and the silver foil stacked on the anode drawn-out portion. The exposed side face on the anode side was processed so as to be saw tooth shaped to increase the surface area. Then, a zinc layer was formed on the surface of the exposed anode drawn-out portion by metal substitution. Thereafter, a nickel layer and a gold layer were formed in this order on the surfaces of the zinc layer and the exposed silver foil by electroless plating. Finally, an anode terminal was attached with a silver paste. Thus, a solid electrolytic capacitor (sample C) of Embodiment 2 was produced.

On the other hand, a solid electrolytic capacitor (sample D) was produced in the same manner as in the case of sample C, except that the plating layers were not formed on the surface of the saw tooth shaped portion.
Samples E and F Capacitor elements were produced in the same manner as in the case of sample A, and the capacitor elements were laminated to produce a laminate. In this production of the laminate, 16 capacitor elements were used.

A lead frame was attached to the conductive layer of the capacitor element present on the lower surface of the laminate with a silver paste. Thereafter, the laminate was coated with an encapsulating resin by molding. Next, the molded laminate was cut at a predetermined position to expose the lead frame on the cathode side and the anode drawn-out portion. The exposed surface on the anode side was polished so as to be smooth. Then, a zinc layer was formed on the surface of the exposed anode drawn-out portion by metal substitution. Thereafter, a nickel layer and a gold layer were formed in this order by electroless plating. Finally, an anode terminal was attached with a silver paste. Thus, a solid electrolytic capacitor (sample E) in which the surface of the anode in the connection portion between the anode and the anode terminal was smooth was produced.

On the other hand, a solid electrolytic capacitor (sample F) was produced in the same manner as in the case of sample E, except that the plating layer was not formed on the exposed anode drawn-out portion.

A bias voltage of 1 V was applied to the produced solid electrolytic capacitors (samples A to F) to measure ESR values at 100 kHz. Table 1 shows the results.

TABLE 1

| Sample | Shape of connection portion | Plating layer | ESR value (mΩ) |
| --- | --- | --- | --- |
| A | saw tooth shaped | provided | 15 |
| B | saw tooth shaped | not provided | 40 |
| C | saw tooth shaped | provided | 11 |
| D | saw tooth shaped | not provided | 32 |
| E | smooth | provided | 28 |
| F | smooth | not provided | 77 |

As shown in Table 1, the samples A to D in which the connection portions were processed to be saw tooth shaped has lower ESR values than those of the samples E and F. The ESR value was particularly low when the plating layer was formed on the connection portion of the terminal.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A solid electrolytic capacitor comprising:
   at least one capacitor element including a capacitance forming portion;
   an encapsulating resin with which the capacitance forming portion is coated;

an anode terminal and a cathode terminal that are provided such that at least a part thereof is outside the encapsulating resin; and a lead, wherein the capacitor element includes an anode, and a dielectric layer and a solid electrolytic layer that are laminated on a portion of the anode in this order, the lead is electrically connected to the solid electrolytic layer, and a surface of at least one component selected from the anode and the lead has roughness in at least one connection portion selected from a connection portion between the anode and the anode terminal and a connection portion between the lead and the cathode terminal.

2. The solid electrolytic capacitor according to claim 1, wherein the roughness is saw tooth shaped, rectangular, or wave-shaped.

3. The solid electrolytic capacitor according to claim 1, further comprising a conductor provided on a surface of the anode that is parallel to a direction in which the anode is drawn out, wherein the anode is electrically connected to the anode terminal via the conductor.

4. The solid electrolytic capacitor according to claim 3, wherein the surface of a portion of the anode in which the conductor is provided is rough.

5. The solid electrolytic capacitor according to claim 1, further comprising a conductor provided on a surface of the lead that is parallel to a direction in which the lead is drawn out, wherein the lead is electrically connected to the cathode terminal via the conductor.

6. The solid electrolytic capacitor according to claim 5, wherein the surface of a portion of the lead in which the conductor is provided is rough.

7. The solid electrolytic capacitor according to claim 3, wherein the conductor comprises at least one metal selected from gold, silver, copper, aluminum and nickel.

8. The solid electrolytic capacitor according to claim 3, wherein the conductor comprises at least one selected from carbon fibers and carbon particles.

9. The solid electrolytic capacitor according to claim 1, wherein the at least one capacitor element is a plurality of capacitor elements, and the capacitance forming portions of the plurality of capacitor elements are laminated and are coated with the encapsulating resin.

10. The solid electrolytic capacitor according to claim 1, wherein a plating layer is formed on a surface of the at least one component in the at least one connection portion.

11. The solid electrolytic capacitor according to claim 10, wherein the plating layer comprises a zinc layer, a nickel layer and a gold layer that are laminated in this order from the at least one component.

12. The solid electrolytic capacitor according to claim 1, wherein at least one terminal selected from the anode terminal and the cathode terminal is concave.

13. A solid electrolytic capacitor comprising:

a capacitor element including a capacitance forming portion;

an encapsulating resin with which the capacitance forming portion of the capacitor element is coated;

an anode terminal and a cathode terminal that are provided such that at least a part thereof is outside the encapsulating resin; and a lead, wherein the capacitor element includes an anode, and a dielectric layer and a solid electrolytic layer that are laminated on a portion of the anode in this order, the lead is electrically connected to the solid electrolytic layer, and at least one component selected from the anode and the lead is electrically connected to at least one terminal selected from the anode terminal and the cathode terminal via a conductor provided on a surface of the component that is parallel to a direction in which the component is drawn out.

* * * * *